(12) United States Patent
Ando et al.

(10) Patent No.: US 7,795,561 B2
(45) Date of Patent: Sep. 14, 2010

(54) STEAM COOKER

(75) Inventors: Yuzi Ando, Yamatokoriyama (JP); Shinya Ueda, Yamatotakada (JP); Kazuyuki Matsubayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 805 days.

(21) Appl. No.: 10/590,528

(22) PCT Filed: Feb. 23, 2005

(86) PCT No.: PCT/JP2005/002877

§ 371 (c)(1), (2), (4) Date: May 1, 2007

(87) PCT Pub. No.: WO2005/083329

PCT Pub. Date: Sep. 9, 2005

(65) Prior Publication Data

US 2007/0210058 A1  Sep. 13, 2007

(30) Foreign Application Priority Data

Feb. 27, 2004  (JP) .............................. 2004-053656

(51) Int. Cl.
   *A21B 1/00* (2006.01)
   *A21B 1/22* (2006.01)
   *F24H 1/18* (2006.01)
(52) U.S. Cl. ...................................... 219/401; 126/348
(58) Field of Classification Search ................. 219/401, 219/440, 682; 99/330; 126/5, 34, 35, 348
   See application file for complete search history.

(56) References Cited

U.S. PATENT DOCUMENTS

| 5,402,709 | A | * | 4/1995 | Carron et al. ................. 99/331 |
| 5,485,780 | A | * | 1/1996 | Koether et al. ................ 99/419 |
| 6,267,045 | B1 | | 7/2001 | Wiedemann et al. |
| 2007/0210059 | A1 | * | 9/2007 | Ando et al. ................. 219/401 |

FOREIGN PATENT DOCUMENTS

| JP | 54-59372 A | 5/1979 |
| JP | 54-127769 A | 10/1979 |
| JP | 8-49854 A | 2/1996 |
| JP | 2002-153380 A | 5/2002 |
| JP | 2002-517704 A | 6/2002 |

* cited by examiner

*Primary Examiner*—Tu B Hoang
*Assistant Examiner*—Lindsey C Teaters
(74) *Attorney, Agent, or Firm*—Birch, Stewart, Kolasch and Birch, LLP

(57) ABSTRACT

In a steam cooker, a tray-shaped case (51) of a steam temperature-raising device (50) has a recessed part (51a) into which steam from a steam generator flows through steam supply ports (95A-95C) provided in a first sidewall (91). First and second steam superheaters (52, 53) are placed in the recessed part (51a) of the tray-shaped case (51) so as to be axisymmetrical with respect to a center line (L). A plurality of steam outlets (101A-104A, 101B-104B) for supplying steam into a heating chamber sideways are provided in second and third sidewalls (92A, 92B) adjoining the sidewall (91) having the steam supply ports (95A-95C) of the recessed part (51a), and on the opposite side of the steam supply ports (95A-95C). The tray-shaped case (51) is placed on a ceiling panel of the heating chamber and at steam outlets with an opening of the recessed part (51a) directed downward.

8 Claims, 11 Drawing Sheets

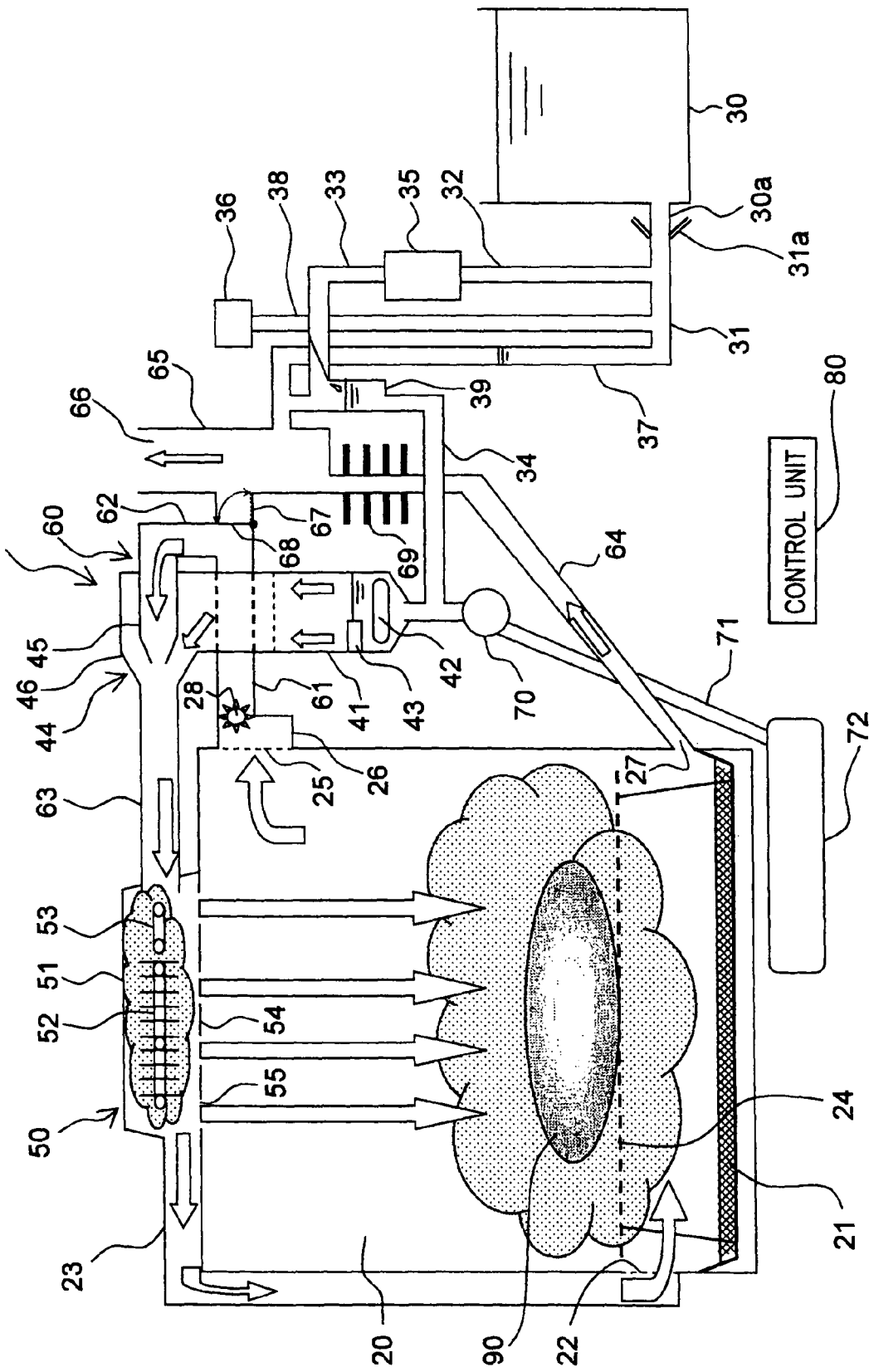

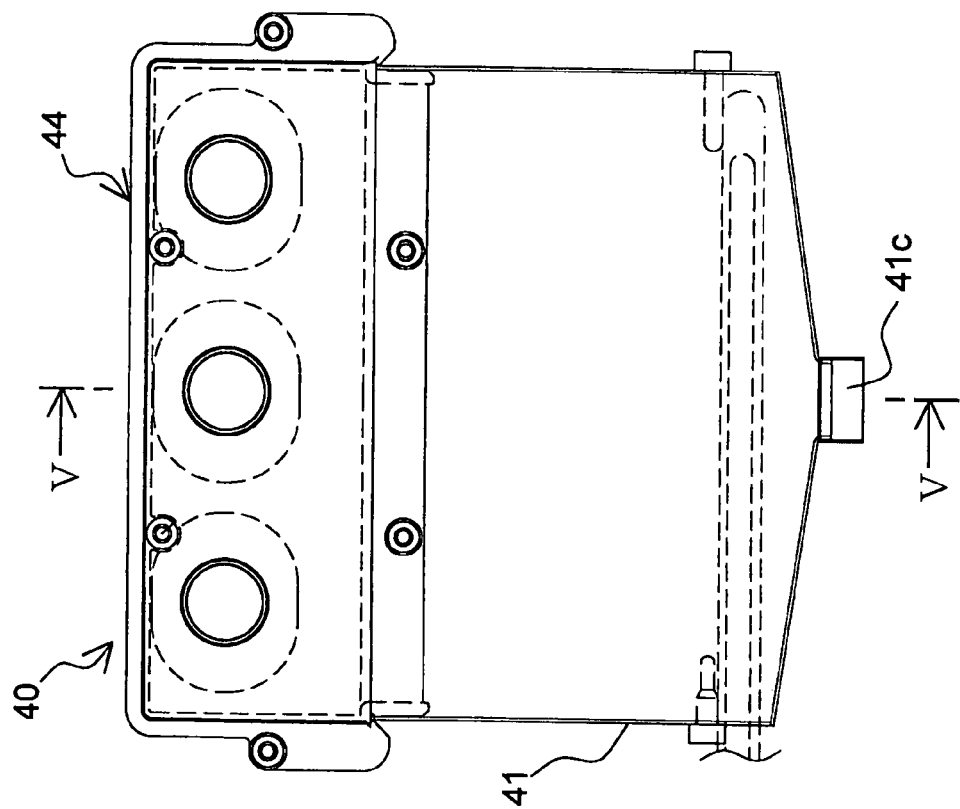
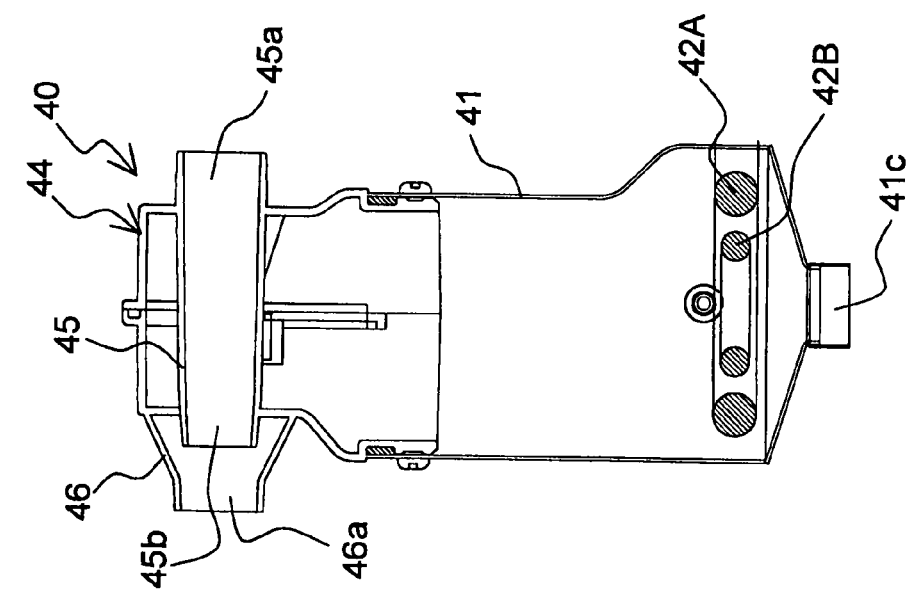

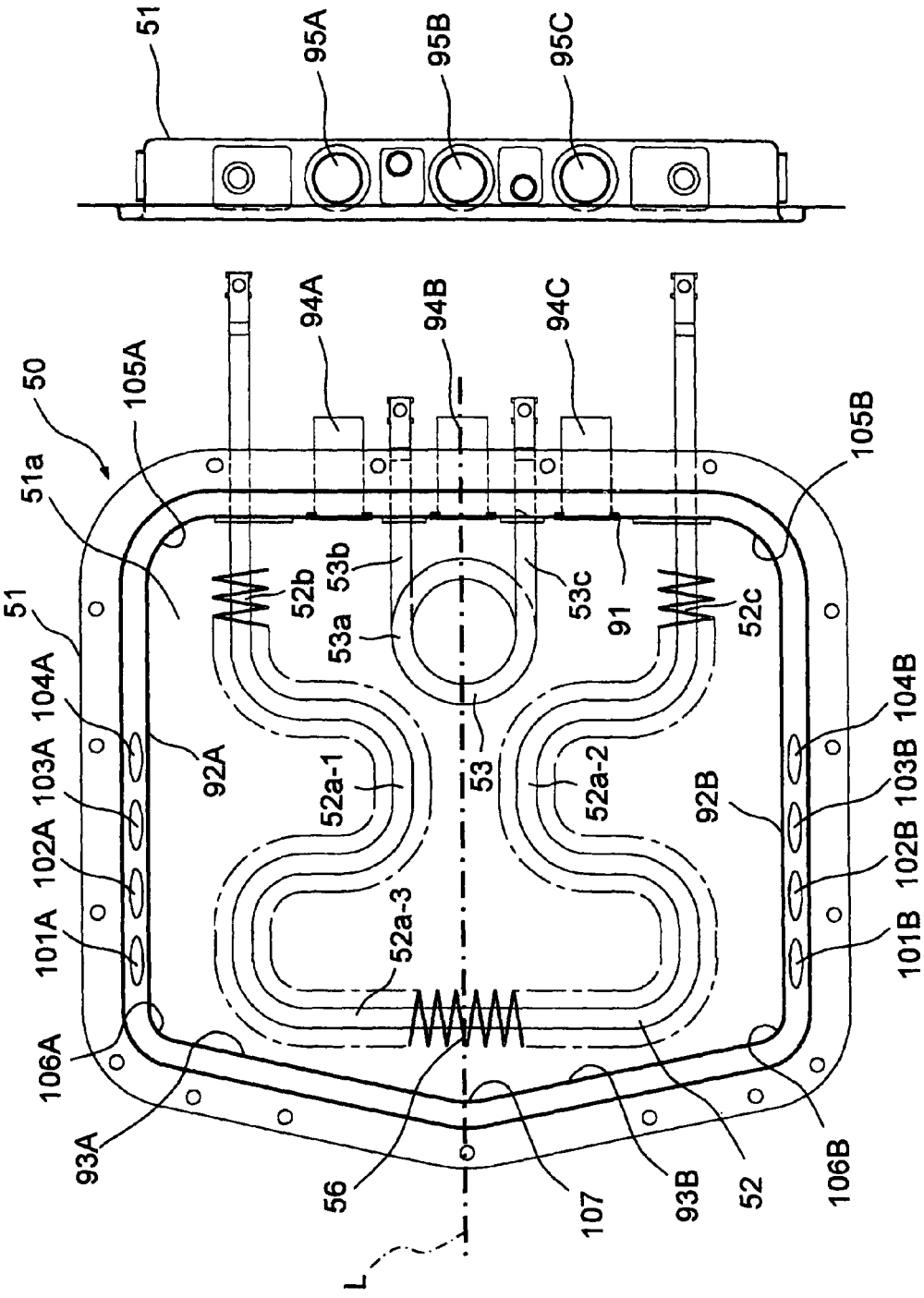

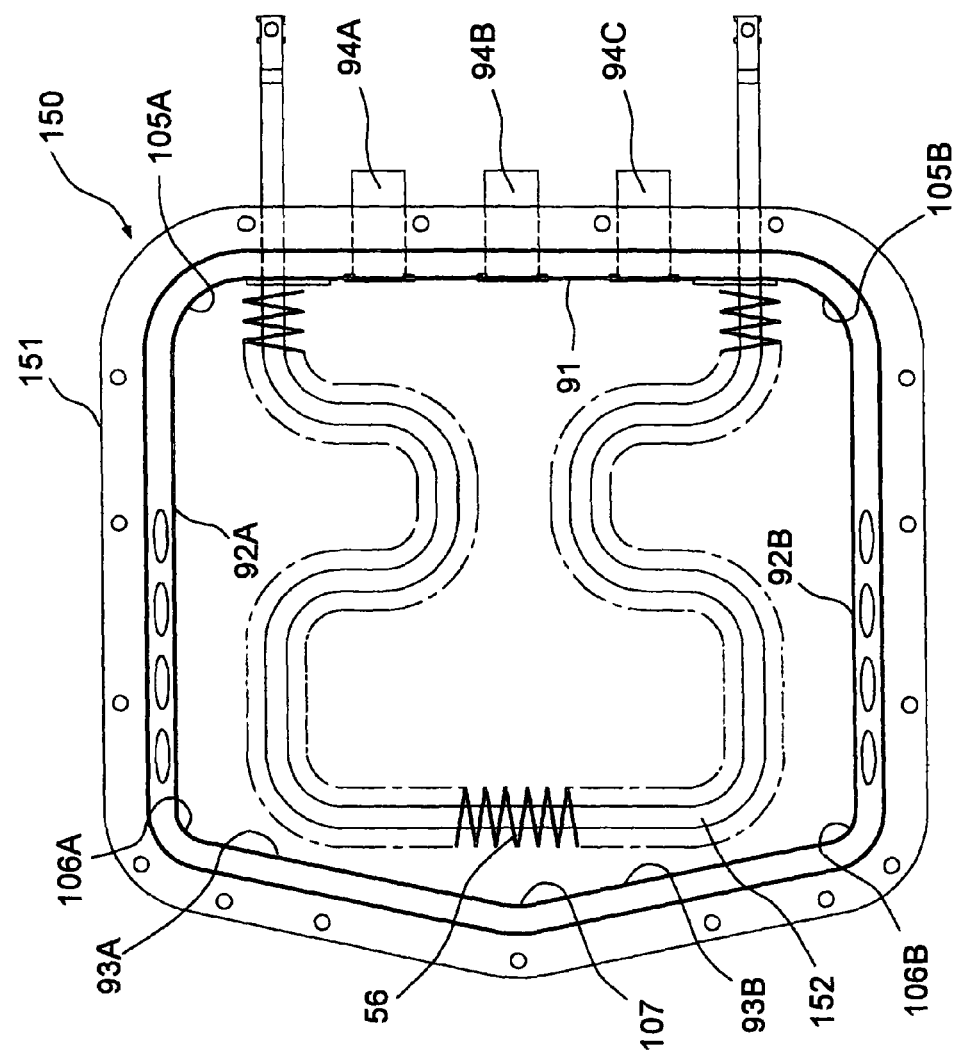

STEAM COOKER

TECHNICAL FIELD

This invention relates to a steam cooker.

BACKGROUND ART

Heretofore, as a steam cooker for cooking an object to be cooked such as food by using steam, there is a one that feeds superheated steam into an oven (for example, see JP 8-49854 A). This steam cooker has a steam generator in which a heater is provided in a pot to generate steam, and a steam superheater that generates superheated steam by heating the steam generated by the steam generator, and the superheated steam generated by the steam superheater is sent into the oven to cook food.

Incidentally, in the conventional steam cooker, superheated steam generated by the steam superheater blows into the oven through a steam outlet provided in an upper portion of a side surface of the oven, the superheated steam is sucked through a suction opening provided in a lower portion of the side surface, so that the superheated steam is circulated in the oven and in a circulation air passage. Therefore, in the conventional steam cooker, airflow in the oven is biased, and temperature distribution does not become uniform, so that uneven cooking occurs in an object to be cooked, and cooking with a good finish cannot be done.

SUMMARY OF THE INVENTION

An object of this invention is, therefore, to provide a steam cooker that can make temperature distribution in a heating chamber uniform and ensure even cooking.

In order to accomplish the above object, a steam cooker according to the present invention comprises:

a steam generator for generating steam;

a steam temperature-raising device for raising a temperature of steam coming from the steam generator;

a heating chamber provided with a ceiling steam outlet on its ceiling side, in which an object to be cooked is heated by steam supplied from the steam temperature-raising device via the ceiling steam outlet, said steam temperature-raising device including:

a tray-shaped case having a recessed part which has a sidewall provided with a steam supply port through which steam from the steam generator enters the recessed part, the tray-shaped case being placed, with an opening of the recessed part directed downward, on the heating chamber at the ceiling steam outlet; and a heater placed in the recess;

wherein a plurality of steam outlets for supplying steam into the heating chamber sideways are provided in both of sidewalls of the recessed part of the tray-shaped case that adjoin the sidewall provided with the steam supply port and on the opposite side of the steam supply port. The wording "opposite side of the steam supply port" herein means a position distant from the steam supply port in the sidewalls that adjoin the sidewall provided with the steam supply port, as shown in FIG. 7.

In to the steam cooker with the above construction, steam generated by the steam generator is raised in temperature by the steam temperature-raising device to become superheated steam, and the superheated steam is supplied into the heating chamber, whereby the object to be cooked in the heating chamber is heated. At this time, steam generated in the steam generator flows in by the steam supply port provided in the sidewall of the recessed part of the tray-shaped case, which is placed on the heating chamber at the ceiling steam outlet. Steam flowing into the recessed part of the tray-shaped case through the steam supply port is bifurcated into the left and right sides after colliding with the sidewalls on the opposite side of the steam supply port of the recessed part, and apart of the bifurcations returns along the sidewalls of the recessed part to the side of the steam supply port and merge with steam entering through the steam supply port. In this manner, steam filling the recessed part of the tray-shaped case is supplied into the heating chamber via the ceiling steam outlet of the heating chamber under the opening of the recess.

Furthermore, part of steam in the recessed part is supplied sideways into the heating chamber via the plurality of steam outlets that are provided in both of the sidewalls adjacent to the sidewall provided with the steam supply ports and on the opposite side of the steam supply port, whereby the temperature distribution of the steam that blows outward toward both sides from the inside of the recessed part via the plurality of steam outlets can be made uniform. Thus, the bias in the temperature distribution of steam supplied into the heating chamber sideways can be reduced. Furthermore, steam of the highest flow rate and the highest temperature (due to heating by the heater) in the recessed part is jetted through the plurality of steam outlets. This vigorously supplies high-temperature steam into the heating chamber. Thereby, steam in the heating chamber is agitated, which is preferred in resolving uneven cooking. Accordingly, the temperature distribution in the heating chamber can be made uniform, and uniform cooking can be performed.

In one embodiment, the recessed part of the tray-shaped case has a planar shape that is roughly symmetrical with respect to a center line of steam flow entering through the steam supply port, and the heater is placed in the recessed part of the tray-shaped case such that a planar shape of the heater is roughly symmetrical with respect to said center line.

In the steam cooker of the above embodiment, the planar shape, namely, a shape in plan view, of the recessed part of the tray-shaped case and the planar shape of the heater placed in the recessed part are individually made roughly axisymmetrical with respect to the center line of the steam flow entering through the steam supply port, whereby the steam flow in the recessed part is prevented by being biased, so that the temperature distribution of steam supplied into the heating chamber is made more uniform.

In one embodiment, a sidewall on the opposite side of the steam supply port of the recessed part of the tray-shaped case is inclined with respect to a plane roughly perpendicular to said center line.

In the steam cooker of the above embodiment, since the sidewall on the opposite side of the steam supply port of the recessed part of the tray-shaped case is inclined, or slanted with respect to the plane that is roughly perpendicular to the center line of the steam flow entering through the steam supply port, when steam flowing into the recessed part collides with the sidewall on the opposite side of the steam supply port in the recessed part and branches off, steam branch flows are made smooth and generation of steam accumulation and so on causing uneven temperature distribution is suppressed. As a result, the temperature distribution of a steam flow in the recessed part can be made more uniform.

In one embodiment, the recessed part of the tray-shaped case has a planar shape that is a generally pentagonal shape having three sides forming a U-shape and two sides continuous with both ends of the U-shape of the three sides and forming a generally V-shape bent outward, and the steam supply port is provided in a sidewall corresponding to a central one of the three sides forming the U-shape of the recessed part of the tray-shaped case.

In the steam cooker of the above embodiment, in the recessed part having a roughly pentagonal planar shape, the two sides forming the V-shape projecting outward, which are continuous with both the ends of the U-shape formed by the three sides, serve as the sidewall that are inclined with respect to the plane roughly perpendicular to the center line. Thereby, when steam flows into the recessed part through the steam supply port provided in the sidewall corresponding to a central one of the three sides forming the U-shape of the recessed part of the tray-shaped case, and collides with the two sidewalls forming the V-shape on the opposite side of the steam supply port, and is bifurcated to the left and right, the steam branch flows are made smooth, and generation of steam accumulation and so on causing uneven temperature distribution is suppressed, so that the temperature distribution of steam flowing in the recessed part can be made uniform.

In one embodiment, the recessed part of the tray-shaped case has a planar shape having three sides forming a U-shape and an arc-shaped outer periphery that is continuous with both ends of the U-shape of the three sides and curves outward, and the steam supply port is provided in a sidewall corresponding to a central one of the three sides forming the U-shape of the recessed part of the tray-shaped case.

In the steam cooker of the above embodiment, in the recessed part of the tray-shaped case, the arc-shaped outer periphery continuous with both the ends of the U-shape formed by the three sides and curving outward, serves as the sidewall that is inclined with respect to the plane roughly perpendicular to the center line. Thereby, when steam flows into the recessed part through the steam supply port provided in the sidewall corresponding to a central one of the three sides forming the U-shape of the recessed part of the tray-shaped case, and collides with the sidewall forming the arc-shaped outer periphery on the opposite side of the steam supply port, and is bifurcated to the left and right, the steam branch flows are made smooth, and generation of steam accumulation and so on causing uneven temperature distribution is suppressed, so that the temperature distribution of steam flowing in the recessed part can be made uniform.

In one embodiment, each of corners of the recessed part of the tray-shaped case has a curved surface so that adjacent sidewalls are smoothly continuous with each other.

In the steam cooker of the above embodiment, the curved surface is provided at each corner of the recessed part of the tray-shaped case so that the adjacent sidewalls are smoothly continuous, whereby the part of steam flowing into the recessed part flows along the sidewalls of the recessed part smoothly. Therefore, the steam flow in the recessed part is stabilized, thus enabling the temperature distribution of steam flowing in the recessed part to be more uniform.

As is apparent from the above description, according to the present invention, a steam cooker that can make a temperature distribution in a heating chamber uniform and secures uniform cooking is realized.

BRIEF DESCRIPTION OF THE DRAWINGS

FIG. 3 is a schematic diagram showing the construction of the steam cooker;

FIG. 5(a) is a side view of the steam generator 40, and FIG. 5(b) is a cross sectional view taken along line V-V of FIG. 5(a);

FIG. 7(a) is a plan view, seen from below, of a steam temperature-raising device of the steam cooker, and FIG. 7(b) is a side view of the steam temperature-raising device, seen from a side of steam supply ports;

FIG. 8(a) is a plan view, seen from below, of a steam temperature-raising device not having a second steam superheater, and FIG. 8(b) is a side view of the steam temperature-raising device, seen from a side of steam supply ports;

DETAILED DESCRIPTION OF THE INVENTION

Figure 1:
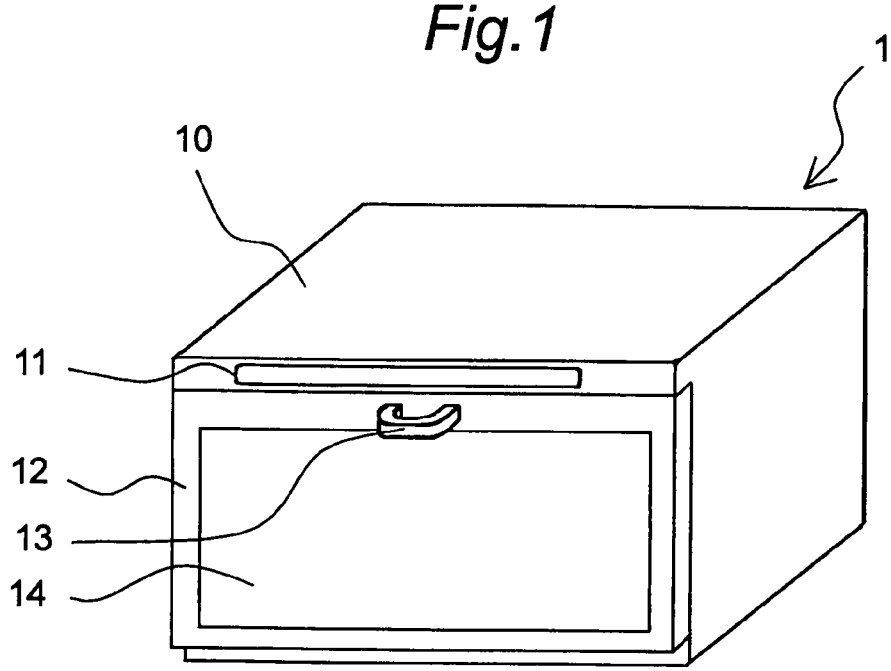
FIG. 1 is a perspective view showing an external appearance of a steam cooker according to one embodiment of the invention.

The steam cooker of the invention will be described using examples shown in the drawings.

FIG. 1 is an external perspective view of a steam cooker 1 according to one embodiment of the invention. In the steam cooker, a front upper portion of a rectangular parallelepiped cabinet 10 is provided with an operation panel 11, and a door 12, which is rotatable around a lower end side of the cabinet, is provided under the operation panel 11. An upper portion of the door 12 is provided with a handle 13, and the door 12 is provided with a window 14 made of thermal glass.

Figure 2:
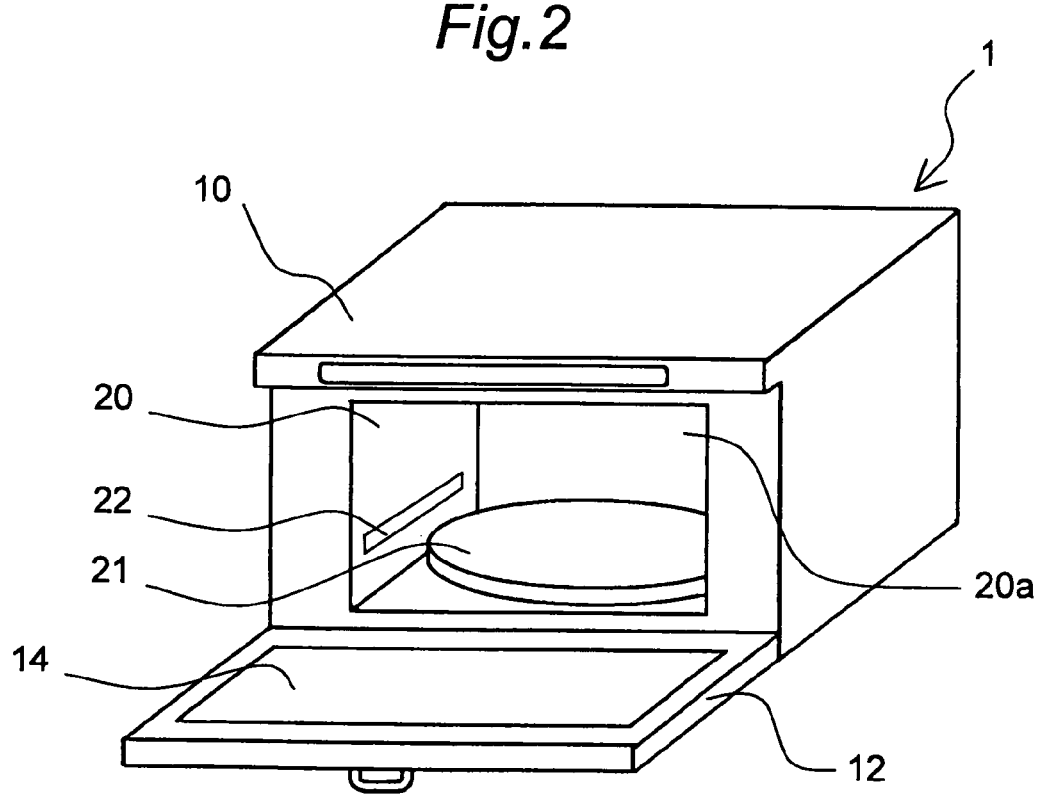
FIG. 2 is a perspective view showing an external appearance of the steam cooker with its door opened.

FIG. 2 is an external perspective view of the steam cooker 1 with the door 12 opened. A rectangular parallelepiped heating chamber 20 is provided in the cabinet 10. The heating chamber 20 has an opening 20a on its front side facing the door 12, and side surfaces, a bottom surface and a top surface of the heating chamber 20 are formed of stainless steel plates. A side of the door 12 facing the heating chamber 20 is formed of a stainless steel plate. A heat insulator (not shown) is placed in the surrounding of the heating chamber 20 and the interior of the door 12 to insulate the inside of the heating chamber 20 from the outside.

A stainless steel-made catch pan 21 is placed at the bottom surface of the heating chamber 20, and a stainless steel wire-made rack 24 (shown in FIG. 3) for receiving an object to be cooked is placed on the catch pan 21. Further, side steam outlets 22, 22 of a roughly rectangular shape, which are longitudinally roughly level to each other (only one of the openings is shown in FIG. 2), are provided at both lateral side surfaces of the heating chamber 20.

FIG. 3 is a schematic view showing the basic construction of the steam cooker 1. As shown in FIG. 3, the steam cooker 1 includes the heating chamber 20, a water tank 30 for storing water for steam, a steam generator 40 for evaporating water supplied from the water tank 30, a steam temperature-raising device 50 for heating steam from the steam generator 40 and a control unit 80 for controlling the steam generator 40, the steam temperature-raising device 50 and other devices.

The lattice-like rack 24 is placed on the catch pan 21 placed in the heating chamber 20, and an object 90 to be cooked is placed at a roughly central portion of the rack 24.

A connecting portion 30a provided at the lower side of the water tank 30 is connected to a funnel-like receiving port 31a provided at one end of a first water supply pipe 31. The suction side of a pump 35 is connected to an end of a second water supply pipe 32, which branches off from the first water supply pipe 31 and extends upward, and one end of a third water supply pipe 33 is connected to the discharge side of the pump 35. A water level sensor 36 for the water tank is provided at an upper end portion of a pipe 38 for the water level sensor, which pipe branches off from the first water supply pipe 31 and extends upward. Further, an upper end portion of an air releasing pipe 37 that branches off from the first water supply pipe 31 and extends upward is connected to an exhaust gas duct 65.

The third water supply pipe 33 has an L shape that is bent roughly horizontally from a vertically placed portion and an auxiliary tank 39 is connected to the other end of the third water supply pipe 33. One end of a fourth water supply pipe 34 is connected to a lower end of the auxiliary tank 39, and the other end of the fourth water supply pipe 34 is connected to a lower end of the steam generator 40. One end of a drain valve 70 is connected to the lower end of the steam generator 40, to which the fourth water supply pipe 34 is connected at one end thereof. One end of a drain pipe 71 is connected to the other end of the drain valve 70, and a water drain tank 72 is connected to the other end of the drain pipe 71. An upper portion of the auxiliary tank 39 communicates with air via the air releasing pipe 37 and the exhaust gas duct 65.

Once the water tank 30 has been connected, water rises in the air releasing pipe 37 until its water level reaches the same water level as that of the water tank 30. Since a tip of the pipe 38 connected to the water level sensor 36 for the water tank is sealed, the water level in the pipe 38 does not rise, but a pressure in a sealed space in the pipe 38 for the water level sensor increases from an atmospheric pressure, depending on the water level of the water tank 30. This pressure change is detected by a pressure detection device (not shown) in the water level sensor 36 for the water tank, whereby the water level in the water tank 30 is detected. Although water level measurement does not require the air releasing pipe 37 while the pump 35 is stationary, the air releasing pipe 37 having an open end is used in order to prevent deterioration of accuracy in the detection of the water level due to direct application of a suction pressure of the pump 35 to the pressure detection device.

The steam generator 40 has a pot 41, to the lower side of which the other end of the fourth water supply pipe 34 is connected, a heater 42 placed in the vicinity of a bottom surface in the pot 41, a water level sensor 43 placed in the vicinity of the upper side of the heater 42 in the pot 41, and a steam suction ejector 44 attached to the upper side of the pot 41. A fan casing 26 is placed outside an intake opening 25 provided at an upper portion of a lateral side of the heating chamber 20. Steam in the heating chamber 20 is sucked through the intake opening 25 by a blower fan 28 placed in the fan casing 26. The sucked steam is sent to an inlet side of the steam suction ejector 44 via a first pipe 61 and a second pipe 62. The first pipe 61 is placed roughly horizontally, and its one end is connected to the fan casing 26. The second pipe 62 is roughly vertically placed, and its one end is connected to the other end of the first pipe 61, and the other end of the second pipe 62 is connected to the inlet side of an inner nozzle 45 of the steam suction ejector 44.

The steam suction ejector 44 is provided with an outer nozzle 46 that covers an outer side of the inner nozzle 45, and the discharge side of the inner nozzle 45 communicates with an internal space of the pot 41. The discharge side of the outer nozzle 46 of the steam suction ejector 44 is connected to one end of a third pipe 63 and a steam temperature-raising device is connected to the other end of the third pipe 63.

The fan casing 26, the first pipe 61, the second pipe 62, the steam suction ejector 44, the third pipe 63 and the steam temperature-raising device 50 form an external circulation passage 60. One end of a discharge passage 64 is connected to a discharge port 27 provided in a lower portion of the lateral side of the heating chamber 20, and the other end of the discharge passage 64 is connected to one end of the exhaust gas duct 65. The other end of the exhaust gas duct 65 is provided with an exhaust gas outlet 66. A radiator 69 is outwardly fitted to the exhaust gas duct 65 side of the discharge passage 64. A connection portion of the first pipe 61 and the second pipe 62 is connected to the exhaust gas duct 65 through an exhaust gas passage 67. At the connection side with the first and second pipes 61, 62, the exhaust gas passage 67 is provided with a damper 68 that opens/closes the exhaust gas passage 67.

The steam temperature-raising device 50 includes a tray-shaped case 51 placed with its opening downward on a ceiling side at a central portion of the heating chamber 20, a first steam superheater 52 placed in the tray-shaped case 51, and a second steam superheater 53 placed in the tray-shaped case 51. A bottom of the tray-shaped case 51 is formed of a metallic ceiling panel 54 serving as a ceiling plane of the heating chamber 20. The ceiling panel 54 is formed with a plurality of ceiling steam outlets 55. Both upper and lower surfaces of the ceiling panel 54 give a dark color by coating and the like. The ceiling panel 54 may also be formed of a metal material that turns into a dark color by repetitive use or a dark ceramic molded product.

One end of each of steam supply passages 23 (in FIG. 3, only one of them is shown), which extend to the left and right sides of the heating chamber 20, is individually connected to the steam temperature-raising device 50. The other end of each of the steam supply passages 23 extends downward along the side surfaces of the heating chamber 20 and is connected to side steam outlets 22, which are provided in a lower position of the lateral side of the heating chamber 20.

Next, the steam generator 40 will be described in detail with reference to FIGS. 4, 5.

Figure 4A:
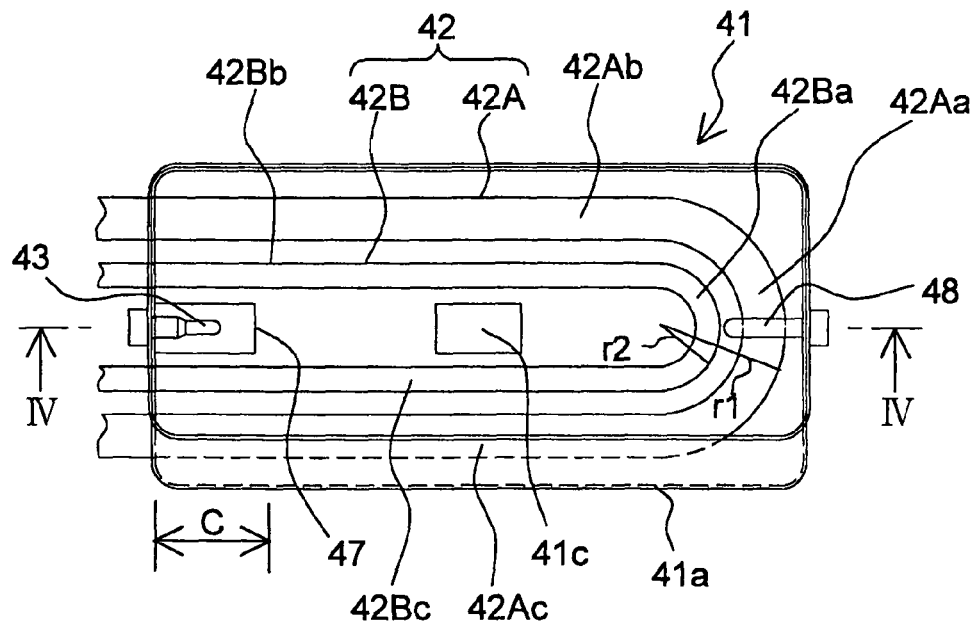
FIG. 4(a) is a plan view of a pot of a steam generator of the steam cooker.
Figure 4B:
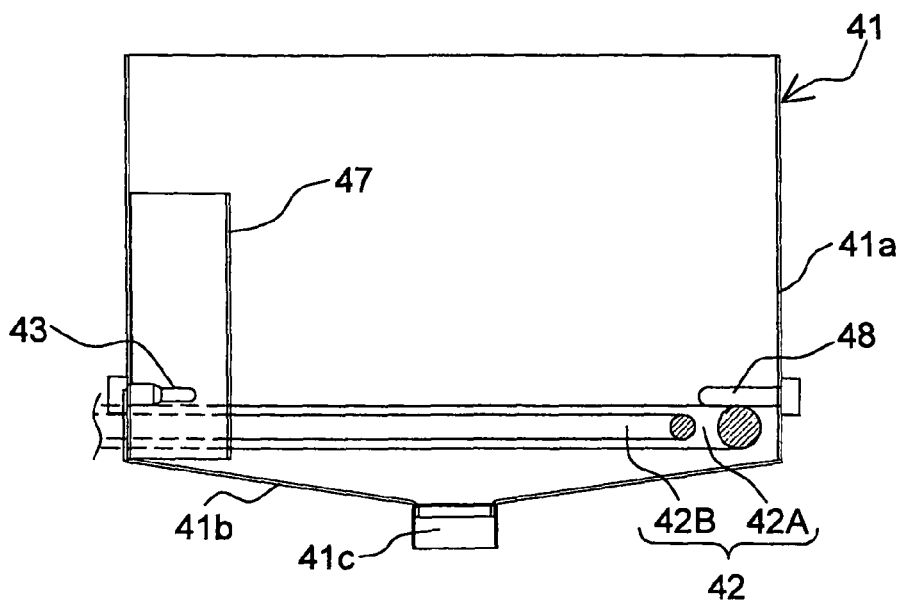
FIG. 4(b) is a side view of the pot.

First, FIG. 4(*a*) is a plan view, seen from above, of the pot 41 of the steam generator 40, and FIG. 4(*b*) is a side view of the pot 41.

As shown in FIGS. 4(*a*), (*b*), the pot 41 includes a cylinder portion 41a which has, in its horizontal plan view, a roughly rectangular shape, a bottom portion 41b provided on the lower side of the cylinder portion 41a and formed of an inclined plane that is gradually lowered toward a center portion of the bottom portion, and a water supply port 41c provided at a roughly center portion of the bottom portion 41b. Although the vertical to horizontal ratio of the planar shape of the pot 41 is 1:2.5, what is required of the planar shape is that the planar shape is an elongated shape, namely a rectangular or elliptic shape. Preferably, however, the vertical to horizontal ratio in the case of the rectangular shape is 1:2, more preferably 1:2.5, and most preferably 1:3 or less.

The heater 42 is placed in the vicinity of the bottom portion 41b in the pot 41. The heater 42 is constructed of a first steam generation heater 42A that is a U-shaped sheath heater having a larger pipe diameter and a second steam generation heater 42B that is a U-shaped sheath heater having a smaller pipe diameter, which is placed inside the first steam generation heater 42A and roughly on the same plane as the first generation heater 42A. The heater 42 is placed adjacent to sidewalls of the cylinder portion 41a of the pot 41. A minimum distance between an outer edge of the heater 42 and the sidewalls of the cylinder portion 41a is set to 2 mm to 5 mm. A lowermost portion of the heater 42 is placed adjacent to the bottom portion 41b of the pot 41. A minimum distance between a lowermost portion of the heater 42 and the bottom portion 41b of the pot 41 is set to 2 mm to 5 mm.

In this embodiment, a 700 W sheath heater having a larger pipe size is used for the first steam generation heater 42A, while a 300 W sheath heater having a smaller pipe size is used for the second steam generation heater 42B. The first steam generation heater 42A has a curved portion 42Aa that has a roughly semicircular arc shape, and two linear portions 42Ab, 42Ac that extend roughly parallel from both ends of the curved portion 42Aa. The second steam generation heater 42B has a curved portion 42Ba that has a generally semicircular arc shape, and two linear portions 42Bb, 42Bc that extend roughly parallel from both ends of the curved portion 42Ba. The curved portion 42Aa of the first steam generation heater 42A has a minimum curvature radius r1, which is determined by the sheath heater having a larger pipe size to be used, while the curved portion 42Ba of the second steam generation heater 42B has a minimum curvature radius r2 (<r1), which is determined by the sheath heater having a smaller pipe size to be used.

A water level sensor 43 is placed in the vicinity of the upper side of the heater 42 in the pot 41 and at a sidewall on the side of a non-heating portion (region C of FIG. 4(a)) inside the second steam generation heater 42B. In the pot 41, a partition plate 47 having a square cornered U-shape in cross section, which surrounds the water level sensor 43, is provided. The partition wall 47 and the sidewall in the pot 41 form a casing having a rectangular shape in cross section. A lower end of the partition plate 47 is located on the upper side of the bottom portion 41b of the pot 41 and beneath the lowermost portions of the first and second steam generation heaters 42A, 42B. On the other hand, an upper end of the partition plate 47 is set at a level that is twice or more of a height from the lowermost portion of the heater 42 to an attaching position of the water level sensor 43. Further, a temperature sensor 48 is placed at a sidewall opposite to the water level sensor 43 in the pot 41.

The water level sensor 43 is a self-heating thermistor. In water, a temperature ranging from about 100° C. to 140° C. is detected depending on a water temperature ranging from about 20° C. to 100° C., while, in air, a temperature ranging from about 140° C. to 150° C. is detected. Based on the water temperature detected by the temperature sensor 48, the temperature detected by the water level sensor 43 is determined, whereby the presence or absence of water, namely whether or not water is present at the attaching position of the water level sensor 43 is determined.

FIG. 5(a) is a side view of the steam generator 40, and FIG. 5(b) is a cross sectional view taken along line V-V of FIG. 5(a).

As shown in FIGS. 5(a), (b), the steam suction ejector 44 is attached in a manner so as to cover an upper side opening of the pot 41, which is internally provided with the first and second steam generation heaters 42A, 42B. A fluid (steam) flowing in from an inlet 45a of the inner nozzle 45 is discharged from the opening 45b of the inner nozzle 45 and then discharged from the opening 46a of the outer nozzle 46. At this time, since the discharge side of the inner nozzle 45 communicates with an internal space of the pot 41, saturated steam generated in the pot 41, which is led to the opening 46a side of the outer nozzle 46, is discharged from the opening 46a of the outer nozzle 46 together with steam discharged from the opening 45b of the inner nozzle 45. That is, saturated steam with a temperature of 100° C. and a pressure of 1 atm. (i.e., 1013.25 hPa), which is generated by boiling water in the pot 41, is sucked into a circulating airflow that passes the external circulation passage 60 (shown in FIG. 3). By the structure of the steam suction ejector 44, saturated steam is immediately sucked up. Since no pressure is applied in the steam generator 40, discharge of saturated steam is not hindered.

Next, a control block diagram of the steam cooker 1 shown in FIG. 6 will be described.

Figure 6:
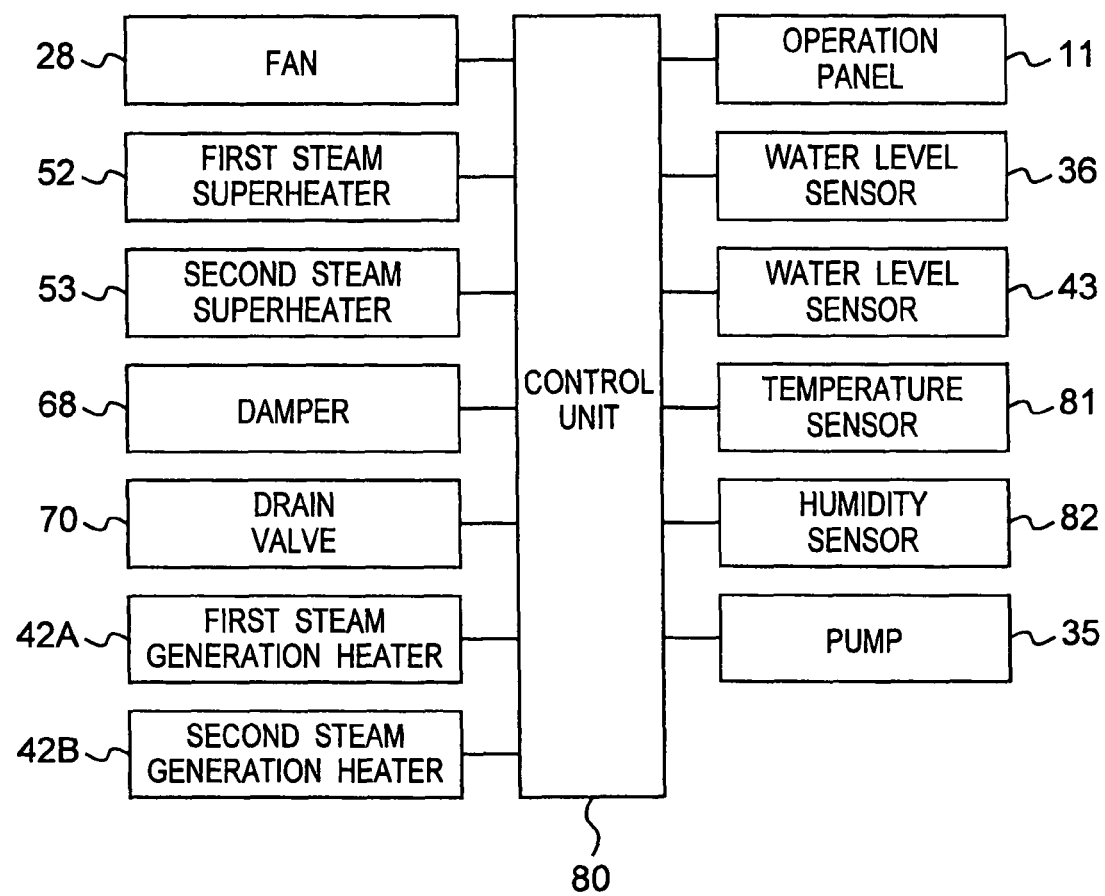
FIG. 6 is a control block diagram of the steam cooker.

As shown in FIG. 6, connected to the control unit 80 are the blower fan 28, the first steam superheater 52, the second steam superheater 53, the damper 68, the drain valve 70, the first steam generation heater 42A, the second steam generation heater 42B, the operation panel 11, the water level sensor 36 for the water tank, the water level sensor 43, a temperature sensor 81 for detecting a temperature in the heating chamber 20 (shown in FIG. 3), a humidity sensor 82 for detecting a humidity in the heating chamber 20, and the pump 35.

The control unit 80 has a microcomputer and an input/output circuit. Based on detection signals received from the water level sensor 36 for the water tank, the water level sensor 43, the temperature sensor 81, and the humidity sensor 82, the control unit 80 controls the blower fan 28, the first steam superheater 52, the second steam superheater 53, the damper 68, the drain valve 70, the first steam generation heater 42A, the second steam generation heater 42B, the operation panel 11, and the pump 35 in accordance with a predetermined program.

In the steam cooker 1 with the above construction, a power switch (not shown) on the operation panel 11 is pushed to power up, and a cooking operation is started by an operation of the operation panel 11. Then, the control unit 80 first closes the drain valve 70, and starts to operate the pump 35 in a state in which the exhaust gas passage 67 is closed by the damper 68. Water is supplied by the pump 35 from the water tank 30 into the pot 41 of the steam generator 40 via the first through fourth water supply pipes 31-34. Then, when the water level sensor 43 detects that the water level in the pot 41 has reached a predetermined level, the control unit 80 stops the pump 35 to stop water supply.

Next, the first and second steam generation heaters 42A, 42B are turned on, and a predetermined amount of water stored in the pot 41 is heated by the first and second steam generation heaters 42A, 42B.

Subsequently, simultaneously with turn-on of the first and second steam generation heaters 42A, 42B, or when the water temperature in the pot 41 has reached a predetermined temperature, the blower fan 28 is turned on, and, at the same time, the first steam superheater 52 is turned on. Then, the blower fan 28 sucks air (including steam) in the heating chamber 20 through the intake openings 25 and sends the air (including steam) to the external circulation passage 60. Since a centrifugal fan is used as the blower fan 28, it is possible to generate a higher pressure than with a propeller fan. Furthermore, the centrifugal fan used as the blower fan 28 is rotated at a high speed by a DC motor, whereby a flow rate of the circulating airflow can be highly increased.

Next, when water in the pot 41 of the steam generator 40 boils, saturated steam is generated. The generated saturated steam merges into the circulating airflow that goes through the external circulation passage 60, at the steam suction ejector 44. Steam ejected from the steam suction ejector 44 flows into the steam temperature-raising device 50 at a high speed via the third pipe 63.

Steam flowing into the steam temperature-raising device 50 is heated by the first steam superheater 52 to be superheated steam of about 300° C. (which varies depending on the type of cooking). A part of the superheated steam is jetted downward into the heating chamber 20 from the plurality of ceiling steam outlets 55 provided in the lower ceiling panel 54. Another part of the superheated steam is jetted from the side steam outlets 22 in both of the lateral sides of the heating chamber 20 via the steam supply passages 23, which extend to the left and right sides of the steam temperature heating device 50.

Thereby, superheated steam jetted from the ceiling side of the heating chamber 20 is vigorously supplied to the object 90 side. Also, superheated steam jetted from the left and right lateral sides of the heating chamber 20 is supplied in a manner so as to wrap the object 90, while going up from the lower side of the object 90, after colliding with the catch pan 21. Thereby, a convective superheated steam flow, in which steam blows down into a central portion and ascends in its outer side, is generated in the heating chamber 20. The convective superheated steam flow repeats a cycle of being sucked into the intake openings 25, passing the external circulation passage 60 and returning to the inside of the heating chamber 20 again.

In this manner, by forming a convective superheated steam flow in the heating chamber 20, it becomes possible to jet superheated steam, which is sent from the steam temperature-raising device 50, from the ceiling steam outlets 55 and the side steam outlets 22 so that it efficiently collides with the object 90, while maintaining uniform temperature, humidity distribution in the heating chamber 20. Then, collision of superheated steam heats the object 90. At this time, superheated steam in contact with a surface of the object 90 heats the object 90 also by releasing latent heat that is generated when building up condensation on the surface of the object 90. Thereby, a large quantity of heat can uniformly be imparted to the entire surface of the object 90 surely and promptly. Therefore, uniform cooking that secures a good finish can be realized.

In the cooking operation, an amount of steam in the heating chamber 20 increases with a lapse of time, and an excess amount of steam is discharged from the exhaust gas outlet 66 via the discharge port 27, the discharge passage 64 and the exhaust gas duct 65. At this time, a radiator 69 provided on the discharge passage 64 cools steam passing the discharge passage 64 to form condensation, whereby steam is prevented from being discharged to the outside as such. Water condensed by the radiator 69 within the discharge passage 64 runs down the discharge passage 64, is led to the catch pan 21, and disposed of together with water generated by cooking after completion of the cooking.

After completion of the cooking, the control unit 80 displays a message of completion of the cooking on the operation panel 11, and a sound is raised by a buzzer (not shown) provided on the operation panel 11. Thereby, a user who has noticed completion of the cooking opens the door 12. Then, the control unit 80 opens the damper 68 immediately after a sensor (not shown) detects opening of the door 12. Thereby, the first pipe 61 of the external circulation passage 60 communicates with the exhaust gas duct 65 via the exhaust gas passage 67, so that steam in the heating chamber 20 is discharged by the fan 28 from the exhaust gas outlet 66 via the intake openings 25, the first pipe 61, the exhaust gas passage 67 and the exhaust gas duct 65. The operation of the damper is the same even if the user opens the door 12 while cooking. Therefore, the user can safely take out the object 90 from the inside of the heating chamber 20 without being exposed to steam.

The heater 42 is placed in the vicinity of the bottom portion 41*b* in the pot 41 of the steam generator 40 as well as roughly on the same level, whereby the water level of water supplied into the pot 41 can be set to a range from the bottom portion 41*b* of the pot 41 to a little above the upper side of the heater 42. Therefore, by setting the water level in the pot 41 to a range from the bottom portion 41*b* of the pot 41 to a little above the upper side of the heater 42, and making the water level as low as possible, the amount of water in the pot 41, which is heated by the heater 42, can be made as small as possible, and start of steam generation by the steam generator 40 can be quickened. By quickening the start of steam generation by the steam generator 40, the start of superheated steam generation can be quickened, so that time required for cooking can be reduced. In particular, in cooking for the first time after stopping the operation for a long time, start of generation of superheated steam supplied into the heating chamber 20 can be quickened without requiring preheating while it is stopped. Thus, an effect of reducing the cooking time is noticeable.

The heater 42 is placed in the pot 41 whose planar shape is an elongated shape (a roughly rectangular shape in this embodiment), and the sheath heaters (42A, 42B) used as the heater 42 are placed in a manner so as to be along the sidewalls of the pot 41, whereby an area taken up by a region surrounded by an outer edge of the heater 42 is reduced, thus making it possible to increase heater power relative to a floor area (or an area at the water level) taken up by the heater in the pot 41, as well as possible to reduce a planar area of the pot 41. Therefore, by increasing the heater power relative to the floor area (or the area at the water level) taken up by the heater in the pot 41, and reducing the planar area of the pot 41 so that the amount of water is reduced, the steam generation by the steam generator 40 can be quickened more.

In the first steam generation heater 42A that is a U-shaped sheath heater having a larger pipe size and the second steam generation heater 42B that is a U-shaped sheath heater having a smaller pipe size, which is placed inside the first generation heater 42A and roughly at the same level as the first generation heater 42A, the radius of curvature of the curved portion 42Ba is made to be the minimum. The radius of curvature is determined by the pipe size of the sheath heater and the like. Then, if the power is applied to the heater in the same condition, the area taken up by the region surrounded by the outer edge of the heater 42 can be reduced so that the heater power relative to the area (or the area at the water level) taken up by the heater in the pot 41 is made highest. By making the heater power relative to the area (or the area at the water level) taken up by the heater in the pot 41 high, start of steam generation by the steam generator can be quickened more. Energization of the first steam generation heater 42A having a high power (700 W) and energization of the second steam generation heater 42B having a low power (300 W) is switched by the control unit 80, thereby making it possible to control the power applied for steam generation depending on a combination of the heaters. This enables the generation of steam depending on the type of cooking.

FIG. 7(*a*) is a plan view, seen from below, of the steam temperature-raising device 50 of the steam cooker, and FIG. 7(*b*) is a side view of the steam temperature-raising device seen from the side of steam supply ports. In the steam temperature-raising device 50, as shown in FIGS. 7(*a*), (*b*), the first steam superheater 52 that is a high power (1000 W) sheath heater having a larger pipe size and the second steam superheater 53 that is a low power (300 W) sheath heater having a smaller pipe diameter, or size are placed in the tray-shaped case 51 having a recessed part 51a whose planar shape is a roughly pentagonal shape. The second steam superheater 53 has a higher power density per unit surface area than that of the first steam superheater 52. Although not shown in FIGS. 7(a), (b), the opening of the recessed part 51a of the tray-shaped case 51 is covered by the metallic ceiling panel 54 (shown in FIG. 3) provided on the ceiling plane of the heating chamber 20.

The recessed part 51a of the tray-shaped case 51 has a first sidewall 91 to which steam supply pipes 94A, 94B, 94C are connected, a second sidewall 92A which is adjacent to one side of the first sidewall 91 through a round portion 105A and is roughly perpendicular to the first sidewall 91, a third sidewall 92B which is adjacent to the other side of the first sidewall 91 through a round portion 105B and is roughly perpendicular to the first sidewall 91 and parallel to the second sidewall 92A, a fourth sidewall 93A which is adjacent to the second sidewall 92A through a round portion 106A and forms a blunt angle with the second sidewall 92A, and a fifth sidewall 93B which is adjacent to the third sidewall 92B through a round portion 106B, forms a blunt angle with the third sidewall 92B, and also forms a blunt angle with the fourth sidewall 93A. The fourth sidewall 93A and the fifth sidewall 93B are adjacent to each other through a round portion 107. In the tray-shaped case 51, the round portions 105A, 106A, 106B, 107 that are corner portions of the recessed part 51a having a curved surface are formed by drawing.

In the tray-shaped case 51, the side of the first sidewall 91 to which the steam supply pipes 94A, 94B, 94C are connected corresponds to the back side (FIG. 7(a) on the right) of the steam cooker 1, while the side of the forth sidewall 93A and the fifth sidewall 93B corresponds to the front side (FIG. 7(a) on the left) of the steam cooker 1. The steam supply pipe 94A having a steam supply port 95A is connected to a roughly central portion of the first sidewall 91, and the steam supply pipes 94B, 94C having steam supply ports 95B, 95C are connected on both sides of the steam supply pipe 94A at predetermined intervals. Steam outlets 101A, 102A, 103A, 104A are provided at predetermined intervals in the second sidewall 92A from the front side toward the back side, and at positions in the third sidewall 92B opposite to the steam outlets 101A-104A, steam outlets 101B, 102B, 103B, 104B are provided. The steam outlets 101A-104A, and the steam outlets 101B-104B are connected to the steam supply passage 23 shown in FIG. 3. The discharge side of the steam suction ejector 44 is connected to the inlet port side of the steam supply pipes 94A, 94B, 94C via the third pipe 63 shown in FIG. 3.

A first and a second non-heating portion 52b, 52c of the first steam superheater 52 pass through the sidewall 91 and fixed at the outside of the steam supply pipes 94A, 94C. Electric wirings (not shown) are connected to leading ends of the first and the second non-heating portion 52b, 52c of the first steam superheater 52. The first steam superheater 52 has a planar shape roughly axisymmetrical with respect to the center line L of the flow of steam flowing in from the steam supply ports 95A, 95B, 95C, and includes the two non-heating portions 52b, 52c placed parallel to the center line L at a predetermined interval, two roughly U-shaped heating portions 52a-1, 52a-2 which are connected, at one end thereof, to the leading ends of the non-heating portions 52b, 52c and which are each curved toward the center of the recessed part 51a, and a roughly U-shaped third heating portion 52a-3 which connects the two first and second heating portions 52a-1, 52a-2. Spiral heat radiation fins 56 are provided around the first to third heating portions 52a-1 to 52a-3 and a part of the first and second non-heating portions 52b, 52c of the first steam superheater 52.

Non-heating portions 53b, 53c at both ends of the second steam superheater 53 pass through the sidewall 91 and are fixed between the steam supply pipes 94A and 94B and between the steam supply pipes 94B and 94C, respectively. Electric wirings (not shown) are connected to leading ends of the non-heating portions 53b, 53c of the second steam superheater 53. A heating portion 53a of the second steam superheater 53 has a circular shape and both ends of the circular heating portion 53 have a shape continuous with the non-heating portions 53b, 53c. The second steam superheater 53 has a planar shape roughly axisymmetrical with respect to the center line L of the flow of steam flowing in from the steam supply ports 95A, 95B, and 95C.

A part of steam in the recessed part 51a of the tray-shaped case 51 blows out into the heating chamber 20 from the steam outlets 101A-104A, 101B-104B, which are provided in the second and third sidewalls 92A, 92B facing each other across the center line L and on the side (front side) opposite from the steam supply ports 95A, 95B, 95C, and also from the side steam outlets 22A, 22B (shown in FIG. 12) via the steam supply passage 23 (shown in FIG. 3).

FIG. 8(a) shows a plan view, seen from below, of a steam temperature-raising device not having a second steam superheater, and FIG. 8(b) shows a side view of the steam temperature-raising device seen from the side of steam supply ports. The steam temperature-raising device 150 has the same construction as that of the steam temperature-raising device shown in FIGS. 7(a) and 7(b) except for not having the second steam superheater and the shape of the first steam superheater, and thus corresponding components are denoted by the same numerals and their description is omitted. In FIG. 8(a), the reference numeral 151 denotes a tray-shaped case not provided with a fitting place for a second steam superheater, the reference numeral 152 denotes a first steam superheater, the reference numerals 105A, 105B, 106A, 106B, and 107 denote round portions.

Next, the steam flow at the steam temperature-raising device 50 will be described using FIG. 9(a).

Figure 9A:
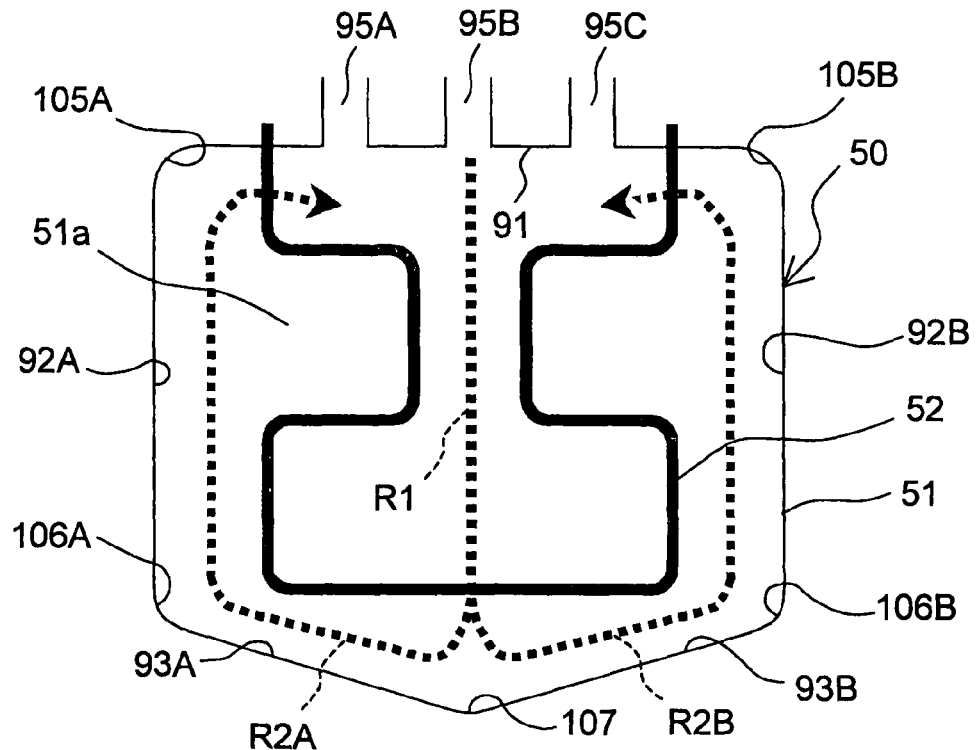
FIG. 9(a) is a schematic view showing a steam flow in the steam temperature-raising device.

As shown in FIG. 9(a), steam supplied from the steam generator 40 (shown in FIG. 3) passes the steam supply ports 95A, 95B, 95C on the upper side in the figure (the back side) and flows downward in the figure (the front side) into the tray-shaped case 51. For example, if focusing on a steam flow R1 flowing in from the steam supply port 95B, the steam flow R1 is divided into a fourth sidewall 93A side and a fifth sidewall 93B side to be branch flows R2A and R2B, respectively, in the vicinity of the round portion 107 of the recessed part 51a of the tray-shaped case 51. A part of the branch flow R2A flows sideways along the fourth sidewall 93A, turns in the vicinity of the round portion 106A so as to flow along the second sidewall 92A, and then turns inward in the round portion 105A to merge into the flow R1 again. Similarly, a part of the branch flow R2B flows sideways along the fifth sidewall 93B, turns in the vicinity of the round portion 106B so as to flow along the third sidewall 92B, and turns inward in the round portion 105B to merge into the flow R1 again. Further, steam flowing in from the other steam supply ports 95A, 95C also flows along the steam flow R1 flowing in from the steam supply port 95B.

In this manner, superheated steam is generated by heating steam in the recessed part 51a of the tray-shaped case 51 by means of the first and second steam superheaters 52, 53. The thus generated superheated steam blows out from the ceiling steam outlets 55 (shown in FIG. 3) and the steam outlets 101A-104A, 101B-104B.

Figure 9B:
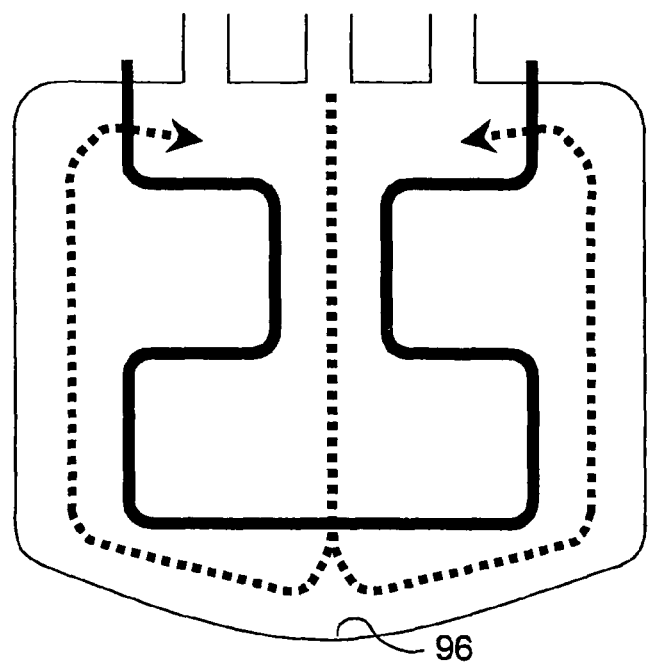
FIG. 9(b) is a schematic view showing another example of a tray-shaped case of the steam temperature-raising device.

In the steam temperature-raising device 50 of the above embodiment, the planar shape of the recessed part 51a of the tray-shaped case 51 is made in a roughly pentagonal shape having three sides forming a U-shape, and two sides that form a V-shape projecting outward, which are continuous with both ends of the U-shape of the three sides. However, the planar shape of the recessed part of the tray-shaped case is not limited to this. For example, as shown in FIG. 9(b), a shape having three sides forming a U-shape and a wall surface 96 with an arc-shaped outer periphery that is continuous with both ends of the U-shape of the three sides may be applied.

Figure 10:
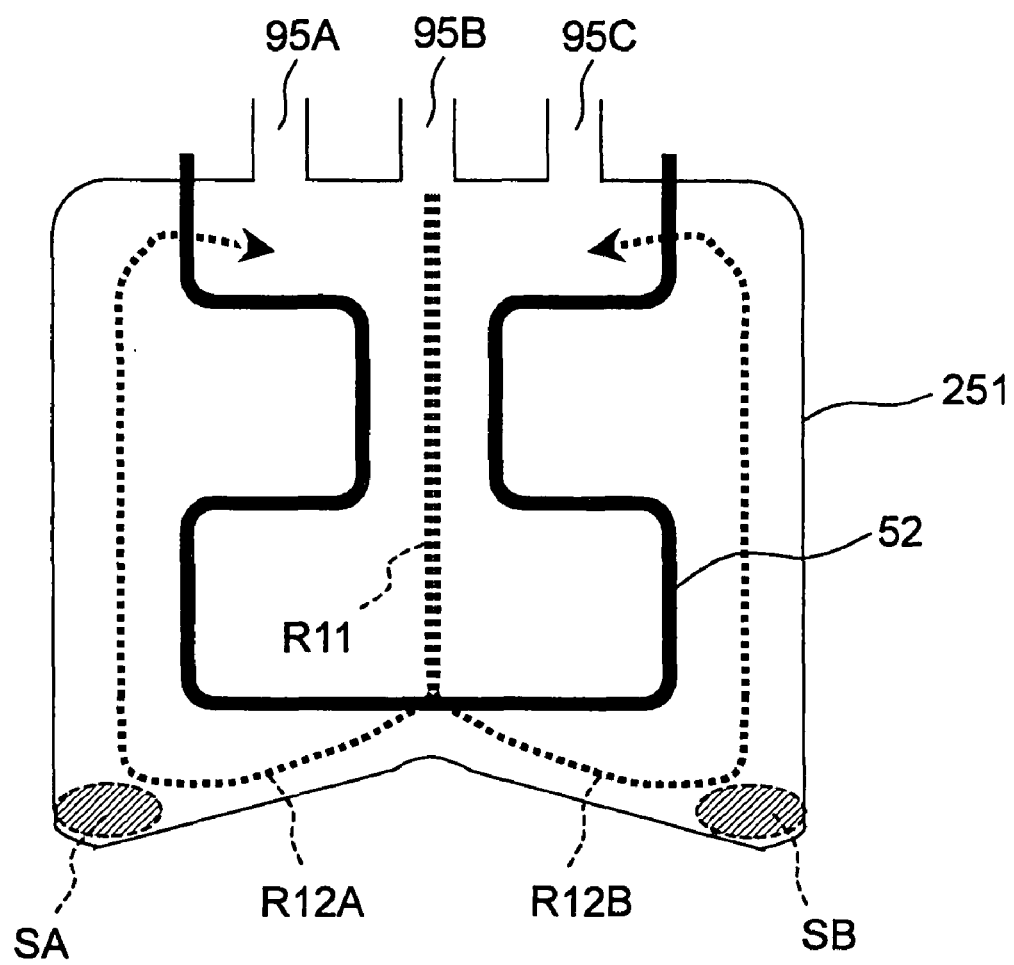
FIG. 10 is a schematic view showing a steam flow in another steam temperature-raising device.

Contrary to this, for example, in the case where the tray-shaped case of the steam temperature-raising device has a shape in which front corner portions on both sides thereof have an acute angle as shown in FIG. 10, steam flows into a tray-shaped case 251 from the steam supply ports 95A, 95B, 95C on the upper side of the figure (the back side) to the lower side of the figure (the front side). For example, if focusing on a steam flow R11 that flows in from the steam supply port 95B, the steam flow R11 is divided on the opposite side of the steam supply port 95B to be branch flows R12A and R12B. At this time, steam accumulations SA, SB are formed at the acute-angled corner portions, and due to the steam accumulations SA, SB, a steam temperature distribution in the tray-shaped case 251 becomes non-uniform.

Figure 11A:
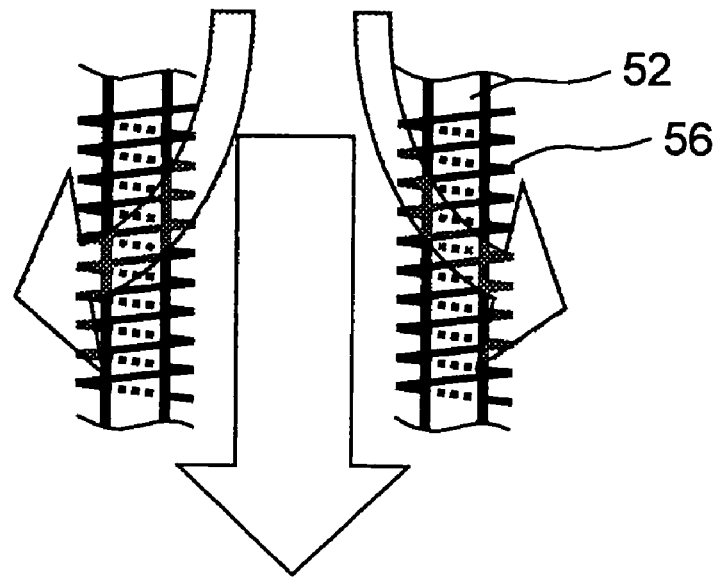
FIG. 11(a) is a view for explaining heat radiation fins of the steam temperature-raising device of the steam cooker according to the embodiment of the invention.

FIG. 11(a) shows a view for describing heat radiation fins of the steam temperature-raising device of the steam cooker of the invention. This shows parts of the first and second heating portions 52a-1, 52a-2, which are parallel to each other, of the first steam superheater 52 in the vicinity of the first sidewall 91 of the tray-shaped case 51 (shown in FIGS. 7(a), (b)). Since the spiral heat radiation fins 56 are provided in the same winding direction around the first steam superheater 52, inclined planes of the heat radiation fins 56 are inclined in the same direction. Therefore, for example, influence of the inclined planes of the heat radiation fins 56 on steam flowing from the upper side to the lower side in the figure through the center of the first and second heating portions 52a-1, 52a-2, which are parallel to each other, of the first steam superheater 52 shown in FIG. 11(a) varies. However, in this embodiment, the fin pitch of the spiral heat radiation fins 56 that are provided around the first steam superheater 52 is set to 10 mm, whereby the distribution of the degree of influence (disturbance or resistance loss) of the heat radiation fins 56 on the steam flow blowing out from the steam supply ports 94A, 94B, 94C (shown in FIG. 9) is made axisymmetrical with respect to the center line L of steam.

Figure 11B:
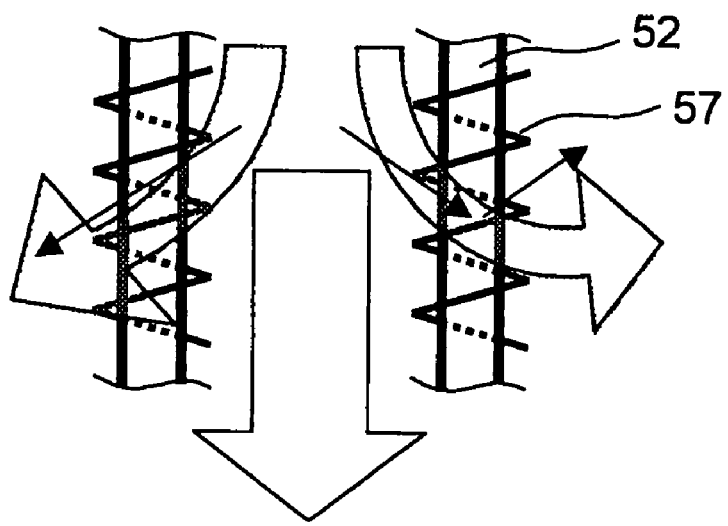
FIG. 11(b) is a view for explaining heat radiation fins having a wider pitch than that of the heat radiation fins of FIG. 11(a)

As shown in FIG. 11(b), in the case where heat radiation fins 57 having a wider fin pitch than that of FIG. 11(a) are provided around the first steam superheater 52, the influence of the heat radiation fins 57 on the steam flow blowing out from the steam supply ports 94A, 94B; 95C (shown in FIG. 9) varies between the left and right sides, so that the steam flow in the recessed part 51a of the tray-shaped case 51 is disturbed and not stabilized. Consequently, it becomes impossible to make the temperature distribution uniform.

Figure 12:
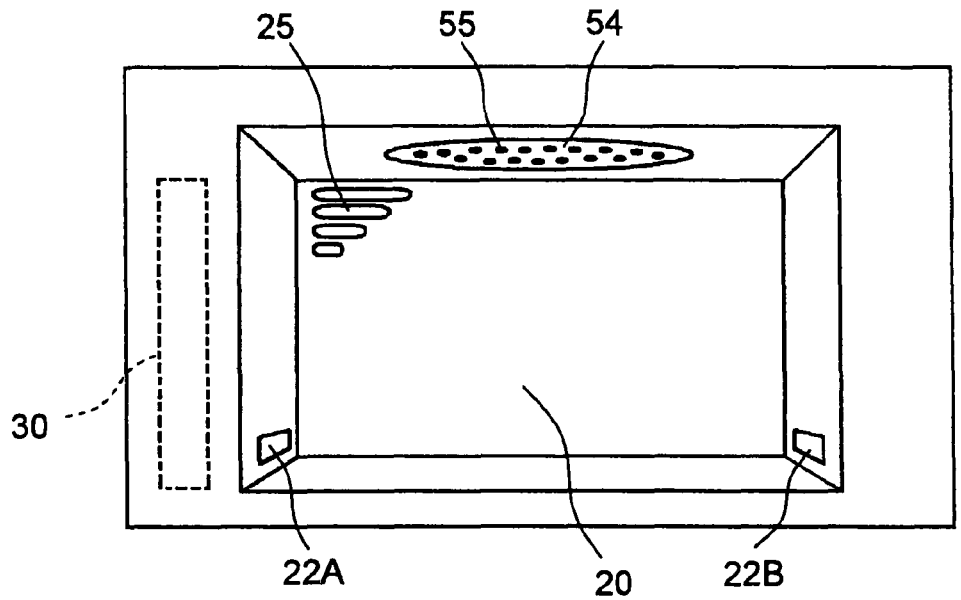
FIG. 12 is a front elevational view of the steam cooker with its door opened.

FIG. 12 is a front elevational view of the steam cooker with its door opened. The intake openings 25 are placed in an upper corner of the back, and the circular panel 54 having the plurality of ceiling steam outlets 55 is attached to the center of the ceiling side of the heating chamber 20. Further, the side steam outlets 22A, 22B, from which steam from the steam temperature-raising device 50 blows out, are placed in a lower position of the left and right lateral sides of the heating chamber 20. The water tank 30 is placed on the observer's left of the heating chamber 20.

In this manner, according to the steam cooker with the above construction, the planar shapes of the recessed part 51a of the tray-shaped case 51 and the first steam superheater 52 placed in the recessed part 51a thereof are made roughly axisymmetrical with respect to the center line L of the flow of steam flowing in from the steam supply ports 95A, 95B, 95C, whereby steam flow in the recessed part 51a is not biased or deviated, the temperature distribution thereof is made uniform, and the temperature distribution of steam supplied into the heating chamber 20 from the ceiling steam outlets 55 of the ceiling panel 54 of the heating chamber 20 can be made uniform.

Further, the fin pitch of the spiral heat radiation fins 56, which are wound around the first steam superheater 52 placed in the recessed part 51a of the tray-shaped case 51, is set to 10 mm or less, whereby the degree of influence (disturbance or resistance loss) on the steam flow blowing out from the steam supply ports 95A, 95B, 95C can be made roughly axisymmetrical with respect to the center line L. Consequently, the temperature distribution of steam in the recessed part 51a is made more uniform, and the temperature distribution of steam supplied into the heating chamber 20 from the ceiling steam outlets 55 of the ceiling panel 54 of the heating chamber 20 can be made uniform. Therefore, the temperature distribution in the heating chamber 20 can be made uniform, which makes it possible to perform uniform cooking.

By providing the steam outlets 101A-104A, 101B-104B in the second and the third sidewalls of the recessed part 51a, respectively, which face each other across the center line L, and on the opposite side of the steam supply ports 95A, 95B, 95C, and arranging the steam outlets 101A-104A, 101B-104B in the recessed part 51a so that they are roughly axisymmetrical with respect to the center line L, the amount, flow rate and temperature distribution of steam blowing sideways to the left or right from the inside of the recessed part 51a via the steam outlets 101A-104A, 101B-104B, can be made uniform. Thus, bias or unevenness in the temperature distribution of steam supplied sideways into the heating chamber 20 via the steam supply passage 23 (shown in FIG. 3) can be reduced, so that the temperature distribution in the heating chamber 20 can be made more uniform.

Even if the planar shape of the recessed part of the tray-shaped case and the planar shape of the heater 50 are not axisymmetrical, by providing the plurality of steam outlets for supplying steam sideways into the heating chamber in both of the sidewalls adjacent to the sidewall provided with the steam supply ports of the recessed part of the tray-shaped case on the opposite side of the steam supply ports, the temperature distribution of steam blowing outward to both sides via the plurality of steam outlets can be made uniform.

Since the fourth and fifth sidewalls 93A, 93B of the recessed part 51a of the tray-shaped case 51 are inclined with respect to a plane roughly perpendicular to the center line L of the steam flow flowing in from the steam supply ports 95A, 95B, 95C, when steam flowing into the recessed part 51a collides with the fourth and fifth sidewalls 93A, 93B to be divided into left and right side branches, the steam branch flows are made smooth, and generation of steam accumulation and the like causing uneven temperature distribution is suppressed, so that the temperature distribution of steam that flows in the recessed part 51a can be made uniform.

In the roughly pentagonal recessed part 51a of the tray-shaped case 51, the two sides that are continuous with both ends of the U-shape of the three sides and are directed outward to form a V-shape serve as the fourth and fifth sidewalls 93A, 93B, which are inclined with respect to the plane roughly perpendicular to the center line L. Thereby, when steam flowing into the recessed part 51a of the tray-shaped case 51, whose planar shape is axisymmetrical with respect to the center line L, collides with the fourth and fifth sidewalls 93A, 94B and is divided into the left and right side branches, the steam branch flows are made smooth, generation of steam accumulation and the like, which causes uneven temperature distribution, is suppressed, and the temperature distribution of steam flowing in the recessed part 51a can be made more uniform.

As shown in FIG. 9(b), the planar shape of the recessed part 51a of the tray-shaped case 51 may be a shape having three sides forming a U-shape, and an arc-shaped outer periphery curved outward and connecting with both ends of the U-shape of the three sides. In this case, the arc-shaped outer periphery curved outward serves as the wall 96 inclined with respect to the plane perpendicular to the center line L. Thereby, when steam flowing into the recessed part 51a from the steam supply ports 95A, 95B, 95C collides with the wall 96 having the arc-shaped outer periphery and is divided into the left and right side branches, the steam branch flows are made smooth, and generation of steam accumulation, which causes uneven temperature distribution, is suppressed, so that the temperature distribution of steam that flows in the recessed part 51a can be made more uniform.

Further, the round portions 105A, 105B, 106A, 106B, 107 having a curved surface are provided at the corners of the recessed part 51a of the tray-shaped case 51 so that adjacent sidewalls are smoothly continuous, whereby steam flowing into the recessed part 51a flows along the sidewalls of the recessed part 51a smoothly. Therefore, the steam flow in the recessed part 51a is stabilized, and the temperature distribution of steam flowing in the recessed part 51a is made more uniform.

As shown in FIG. 7(a), because the heat radiation fins 56 are wound around the first to third heating portions 52a-1 to 52a-3 and also a part of the first and second non-heating portions 52b, 52c, heat transferred from the side of the first, second heating portion 52a-1, 52a-2 to the side of the first, second non-heating portion 52b, 52c of the first steam superheater 52 is radiated through the heat radiation fins 56 on the side of the non-heating portion 52b, 52c. Therefore, the first, second non-heating portion 52b, 52c is prevented from reaching a high temperature due to superheat. Thus, a temperature rise in the non-heating portion 52b, 52c of the first steam superheater 52, to which electric wiring is connected, can be suppressed, and high reliability can be obtained.

Since the connection portions between the first and second heating portion 52a-1, 52a-2 to the first and second non-heating portion 52b, 52c of the first steam superheater 52 are located in positions where steam flowing in from the steam supply ports 95A, 95B, 95C collides against the vicinity of the connection portions, steam having a lower temperature than that of steam superheated by the first steam superheater 52 is supplied through the steam supply ports 95A, 95C to the connection portions between the first and second heating portions 52a-1, 52a-2 and the first and second non-heating portions 52b, 52c of the first steam superheater 52. Therefore, heat transferred from the first, second heating portions 52a-1, 52a-2 to the first and second non-heating portions 52b, 52c of the first steam superheater 52 can be radiated by the low-temperature steam through the heat radiation fins 56 on the side of the first and second non-heating portions 52b, 52c, so that a temperature rise in the non-heating portions 52b, 52c, to which electric wiring is connected, can be suppressed effectively. Further, the connection portions of the first and second heating portions to the first and second non-heating portions of the first steam superheater may be placed at positions where steam flowing in from the steam supply ports directly collides against the connection portions.

Of the first steam superheater 52 having a high power and the second steam superheater 53 having a low power, the high-power first steam superheater 52 is provided with the heat radiation fins 56 around the first to third heating portions 52a-1 to 52a-3 and part of the non-heating portions 52b, 52c of, whereby heat transferred from the first, second heating portion 52a-1, 52a-2 with a high calorific power to the first, second non-heating portion 52b, 53c side of the first steam superheater 52 can be radiated through the heat radiation fins 56 on the side of the first, second non-heating portion 52b, 52c, so that a temperature rise of the non-heating portion of the heater, to which electric wiring is connected, can be reduced more effectively.

Furthermore, the first and second steam superheaters 52, 53 are placed in the recessed part 51a of the tray-shaped case 51 of the steam temperature-raising device 50 such that the heat generation density per unit volume of a space in the vicinity of the steam supply ports 95A, 95B, 95C is increased. Therefore, low-temperature steam flowing in from the steam supply ports 95A, 95B, 95C collides with the first and second superheaters 52, 53, which provide a region having a high heat generation density per unit volume, and the low-temperature steam is then heated, so that the temperature distribution in the entire recessed part 51a of the tray-shaped case 51 is made uniform. Thus, the temperature distribution of steam supplied from the ceiling steam outlets 55 into the heating chamber 20 can be made uniform. Accordingly, the temperature distribution in the heating chamber 20 can be made uniform enabling even cooking.

Of the first and second superheaters 52, 53 having different power densities per unit surface area, the second superheater 53 having a higher power density per unit surface area is placed in the vicinity of the steam supply ports 95A, 95B, 95C, whereby low-temperature steam flowing in from the steam supply ports 95A, 95B, 95C is heated by the second steam superheater having the higher power density per unit surface area. Therefore, the start of steam temperature rise can be accelerated, so that a reduction in cooking time is ensured and the temperature distribution in the entire recessed part 51a of the tray-shaped case 51 can be made uniform more effectively.

Of the first and second steam superheaters 52, 53 with different power densities per unit surface area and having a planar shape that is axisymmetrical with respect to the center line L of the steam flow entering from the steam supply ports 95A, 95B, 95C, the second steam superheater 53 having a high power density per unit surface area is placed inside, while the first steam superheater 52 having a low power density per unit surface area is placed outside, whereby low-temperature steam flowing in from the steam supply ports 95A, 95B, 95C is heated by the second steam superheater 53 having a high power density per unit surface area, which is placed inside, and, in its outside, steam is heated by the first steam superheater 52 having a low power density per unit surface area. Therefore, the temperature distribution in the entire recessed part 51a of the tray-shaped case 51 can be made uniform more effectively.

Due to the use of the first and second steam superheaters 52, 53 having a planar shape that is axisymmetrical with respect to the center line L of the steam flow entering from the steam supply ports 95A, 95B, 95C, steam flow is not biased toward the left or right side so that the temperature distribution in the recessed part 51a of the tray-shaped case 51 can be made uniform effectively.

The first steam superheater 52 has the two first and second non-heating portions 52b, 52c that are spaced from each other and placed roughly parallel to the center line L, the two roughly U-shaped first and second heating portions 52a-1, 52a-2 which are connected, at one end thereof, to leading ends of the first and second non-heating portions 52b, 52c, respectively, and which are each curved toward the center of the recessed part 51a into a U shape, and the roughly U-shaped third heating portion 52a-3 that connects between the other ends of the first and second heating portions 52a-1, 52a-2, and the first steam superheater 52 has a planar shape that is axisymmetrical with respect to the center line of the steam flow entering from the steam supply ports 95A, 95B, 95C. Thus, steam flow in the recessed part 51a is not biased, so that the temperature distribution in the entire recessed part 51a of the tray-shaped case 51 can be made uniform effectively.

In the above embodiment, the heater 42 is used, which has the first steam generation heater 42A that is a U-shaped sheath heater having a larger pipe size and the second steam generation heater 42B that is a U-shaped sheath heater having a smaller pipe size, which is placed inside the first steam generation heater 42A. The shape of the heater is not limited to this. However, the heaters are preferably placed roughly on the same level in the vicinity of the bottom portion in the pot.

In the above embodiment, the first steam superheater 52 (shown in FIG. 7) as a planar heater is used for the steam temperature-raising device 50. The shape of the heater is not limited to the above-described one, and any heater may be used as long as it has a planar shape that is roughly axisymmetrical with respect to the center line L of the steam flow flowing in from the steam supply ports.

Figure 13:
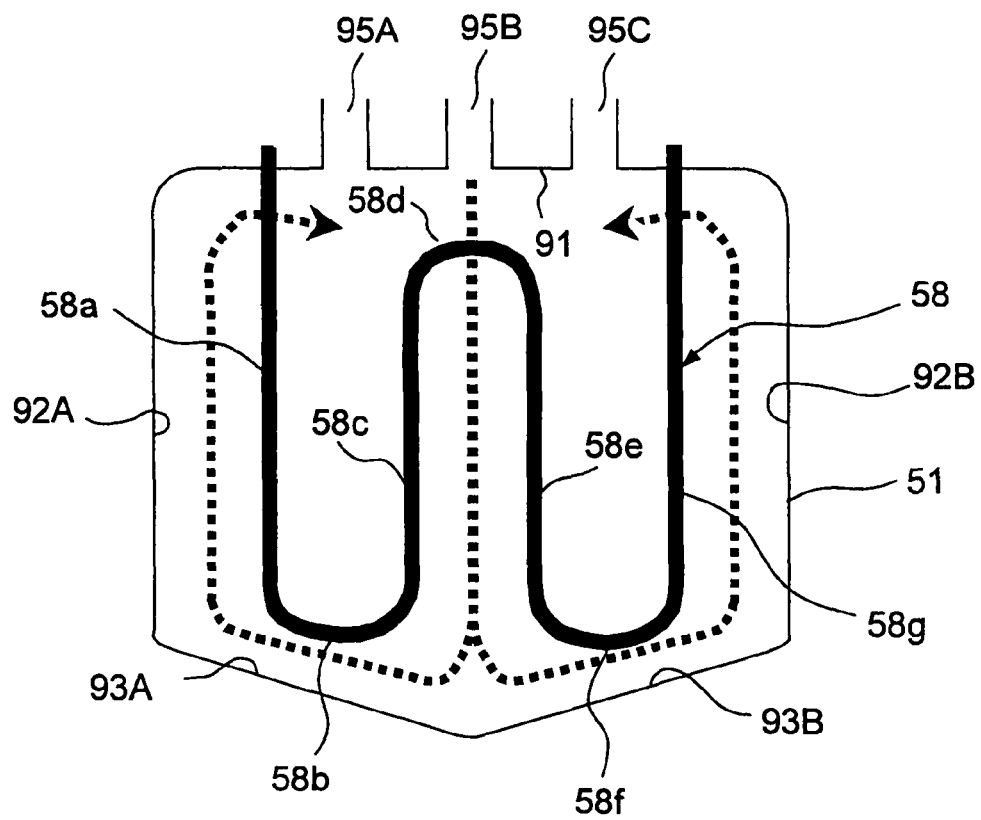
FIG. 13 is a view for explaining another example of a heater to be used in the steam temperature-raising device of the steam cooker.

For example, as shown in FIG. 13, a heater 58 placed in the recessed part 51a of the tray-shaped case 51 may be used. The heater 58 has a linear portion 58a, a semi-circular curved portion 58b, a linear portion 58c, a semi-circular curved portion 58d, a linear portion 58e, a semi-circular curved portion 58f, and a linear portion 58g.

One end (on the side of the non-heating portion) of the linear portion 58a is inserted through the first side wall 91 of the tray-shaped case 51 in the vicinity of one end of the first sidewall 91, and the other end of the linear portion 58a extends approximately parallel to the second sidewall 92A up to the vicinity of the fourth sidewall 93A. The other end of the linear portion 58a is then connected to one end of the semi-circular curved portion 58b, and the other end of the semi-circular curved portion 58b is connected to one end of the linear portion 58c, which extends approximately parallel to the linear portion 58a to the side of the first sidewall 91. The other end of the linear portion 58c is connected to one end of the semi-circular curved portion 58d, and the other end of the semi-circular curved portion 58d is connected to one end of the linear portion 58e, which extends approximately parallel to the linear portion 58c to the opposite side of the first sidewall 91. The other end of the linear portion 58e is connected to one end of the semi-circular curved portion 58f, and the other end of the linear portion 58f is connected to one end of the linear portion 58g, which extends approximately parallel to the third sidewall 92B. The other end (on the side of the non-heating portion) of the linear portion 58g is inserted through the first sidewall 91 in the vicinity of the other end of the first sidewall 91. The heater 58 has a planar shape that is roughly axisymmetrical with respect to the center line L of the steam flow entering from the steam supply ports 95A, 95B, 95C.

The invention claimed is:

1. A steam cooker, comprising:
a steam generator for generating steam;
a steam temperature-raising device for raising a temperature of steam coming from the steam generator;
a heating chamber provided with a ceiling steam outlet on its ceiling side, in which an object to be cooked is heated by steam supplied from the steam temperature-raising device via the ceiling steam outlet, said steam temperature-raising device including:
a tray-shaped case having a recessed part which has a sidewall provided with a steam supply port through which steam from the steam generator enters the recessed part, the tray-shaped case being placed, with an opening of the recessed part directed downward, on the heating chamber at the ceiling steam outlet; and
a heater placed in the recessed part;
wherein a plurality of steam outlets for supplying steam heated by the heater in the recessed part into the heating chamber sideways are provided in both of sidewalls of the recessed part of the tray-shaped case that adjoin the sidewall provided with the steam supply port and on the opposite side of the steam supply port.

2. The steam cooker according to claim 1, wherein the recessed part of the tray-shaped case has a planar shape that is roughly symmetrical with respect to a center line of steam flow entering through the steam supply port, and the heater is placed in the recessed part of the tray-shaped case such that a planar shape of the heater is roughly symmetrical with respect to said center line.

3. The steam cooker according to claim 2, wherein a sidewall on the opposite side of the steam supply port of the recessed part of the tray-shaped case is inclined with respect to a plane roughly perpendicular to said center line.

4. The steam cooker according to claim 1, wherein the recessed part of the tray-shaped case has a planar shape that is a generally pentagonal shape having three sides forming a U-shape and two sides continuous with both ends of the U-shape of the three sides and forming a generally V-shape bent outward, and the steam supply port is provided in a sidewall corresponding to a central one of the three sides forming the U-shape of the recessed part of the tray-shaped case.

5. The steam cooker according to claim 1, wherein the recessed part of the tray-shaped case has a planar shape having three sides forming a U-shape and an arc-shaped outer periphery that is continuous with both ends of the U-shape of the three sides and curves outward, and the steam supply port is provided in a sidewall corresponding to a central one of the three sides forming the U-shape of the recessed part of the tray-shaped case.

6. The steam cooker according to claim 1, wherein each of corners of the recessed part of the tray-shaped case has a curved surface so that adjacent sidewalls are smoothly continuous with each other.

7. The steam cooker according to the claim 1, wherein the heater is placed within the recessed part such that the heater is located above the ceiling steam outlet.

8. A steam cooker, comprising:
a steam generator for generating steam;
a steam temperature-raising device for raising a temperature of steam coming from the steam generator;
a heating chamber provided with a ceiling steam outlet on its ceiling side, in which an object to be cooked is heated by steam with a raised temperature supplied from the steam temperature-raising device via the ceiling steam outlet, said steam temperature-raising device including:

a tray-shaped case having a recessed part which has a sidewall provided with a steam supply port through which steam from the steam generator enters the recessed part, the tray-shaped case being placed, with an opening of the recessed part directed downward, on the heating chamber at the ceiling steam outlet to provide the steam with raised temperature to the ceiling steam outlet; and a heater placed in the recessed part to heat the steam supplied through the steam supply port to raise the temperature thereof;

wherein a plurality of steam outlets for supplying steam heated by the heater in the recessed part into at least one steam passage having at least one outlet in a wall of the heating chamber are provided in both of sidewalls of the recessed part of the tray-shaped case that adjoin the sidewall provided with the steam supply port and on the opposite side of the steam supply port.

* * * * *